Patented Sept. 19, 1944

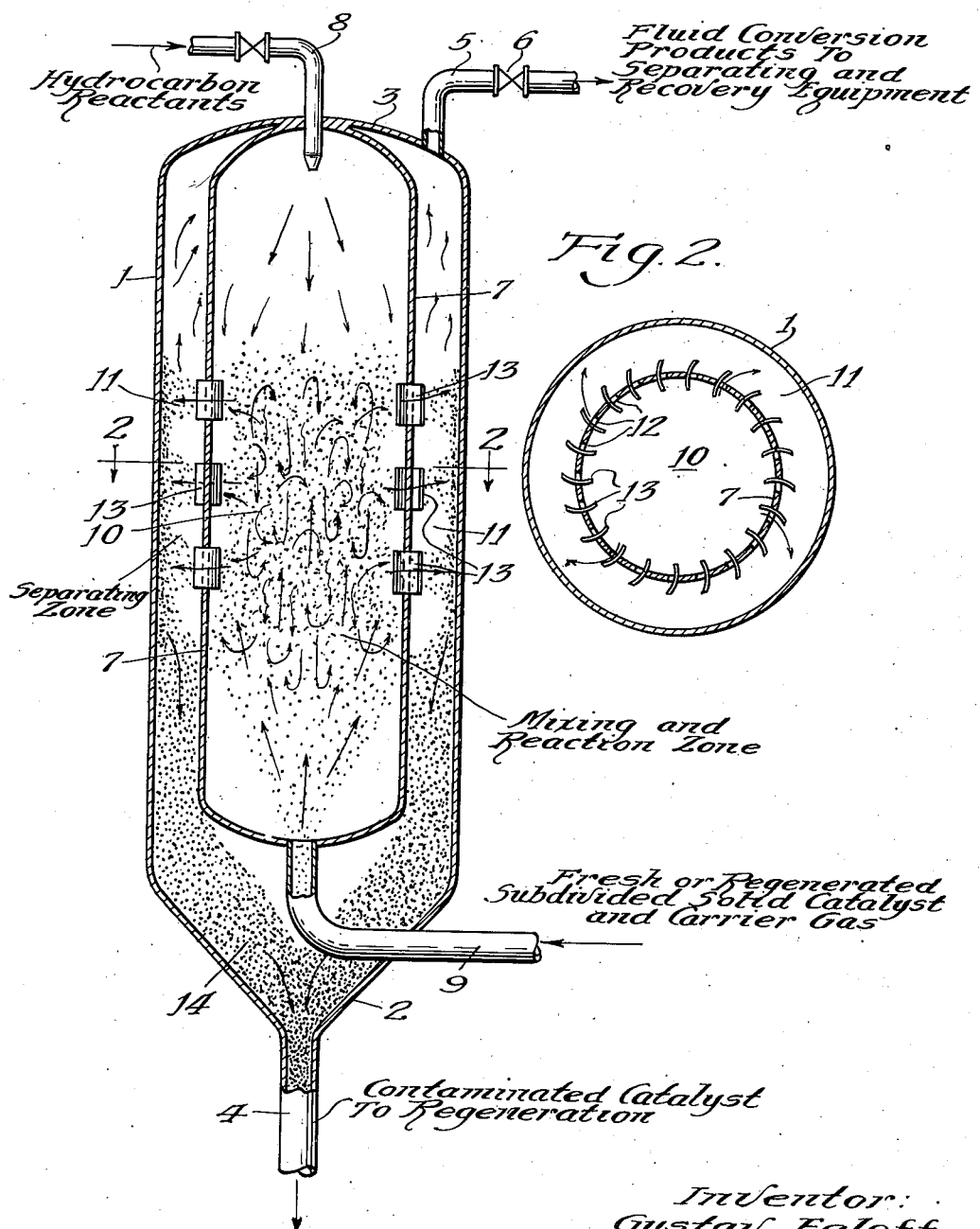

2,358,497

UNITED STATES PATENT OFFICE 2,358,497

METHOD OF CONDUCTING CONVERSION REACTIONS

Gustav Egloff, Chicago, Ill., assignor to Universal Oil Products Company, Chicago, Ill., a corporation of Delaware Application September 11, 1943, Serial No. 501,941

9 Claims. (Cl. 196—52)

This invention relates to an improved process and apparatus for the conversion of fluid reactants in contact with a moving mass of subdivided solid particles which supply heat to, abstract heat from, and/or catalyze the desired reaction.

This invention is particularly adaptable to the catalytic cracking of hydrocarbons and comprises an improved method of obtaining intimate contact between and thorough mixing of hydrocarbon vapors with a mass of subdivided solid cracking catalyst.

However, my invention is not limited to the catalytic cracking of hydrocarbons and, as hereinafter described, it is applicable to a wide variety of conversion reactions including retreatment of olefinic gasolines to reduce the olefin content thereof, dehydrogenation of normally liquid and normally gaseous hydrocarbons, aromatization of normally liquid hydrocarbons, etc. In each case an appropriate solid catalyst may be employed in subdivided form. Moreover, the invention is applicable to the thermal cracking or conversion of hydrocarbons employing a relatively inert subdivided solid contact material as a heat carrying medium. During the various hydrocarbon conversion reactions the subdivided solid catalyst becomes contaminated with a hydrocarbonaceous deposit and its activity is reduced appreciably. My process is also applicable to the regeneration of such contaminated catalysts by contacting with air or other oxygen-containing gases to remove the combustible deposits from the catalyst particles.

One object of the present invention is to provide a novel method for contacting fluid reactants with a subdivided solid contact material in general countercurrent or turbulent flow.

Another object of the invention is to provide an improved process for effecting hydrocarbon conversion reactions in the presence of a subdivided solid catalyst.

In one specific embodiment the invention comprises introducing fluid reactants downwardly at the upper end of a contact zone, introducing a carrier gas and subdivided solid contact material upwardly at the lower end of said contact zone, withdrawing reaction mixture from an intermediate point in said contact zone, and introducing said reaction mixture to a separation zone wherein said contact material is separated from a mixture of reaction products and carrier gas.

Generally speaking, in carrying out hydrocarbon conversion reactions and other contact conversion reactions it is desirable to provide countercurrent flow of catalyst or other contact material with the fluid reactants. In this way the fresh and most active catalyst is always contacted with partially converted reactants, and the most contaminated and least active catalyst is always contacted with the fresh reactants which are most susceptible to conversion. In this manner the maximum catalytic efficiency is obtainable. In methods hereinbefore proposed, however, it has been necessary to employ the contact material in the form of a relatively compact moving bed of granular particles in order to achieve the complete benefits of countercurrent flow. If catalyst particles are permitted merely to "rain" down through an upwardly flowing stream of reactants, there are serious limitations on the velocities which may be used and in any case there is not sufficient turbulence to obtain satisfactory contacting. By the present invention I am able to employ the contact material in finely subdivided form in countercurrent operation thereby combining the beneficial effects of increased contact surface and countercurrent flow.

The invention is practiced by flowing a stream of fluid reactants downwardly in a substantially vertical contact zone and simultaneously flowing a stream of carrier gas containing a subdivided solid contact material suspended therein in a generally upward direction whereby to obtain countercurrent flow of fluid reactants and contact material in at least a portion of said contact zone. Exit ports are provided at an intermediate point in the contact zone and the velocities of the two streams are so regulated that the contact material does not settle out to any substantial extent in the lower portion of the contact zone. An effluent mixture comprising reaction products, carrier gas, and contact material is removed through the exit ports to a communicating separation zone wherein the contact material is recovered from a mixture of reaction products and carrier gas.

The drawing illustrates one form of apparatus embodying the principles of this invention although it is to be understood that the invention is not limited to the particular features of this construction.

Figure 1 illustrates an elevational view, shown principally in longitudinal section, of an apparatus wherein the separating zone consists of an outer annular zone surrounding the contact zone and communicating therewith through a plurality of ports provided with directing vanes.

Figure 2 is a cross-sectional view of the apparatus illustrated in Figure 1, the section being taken along line 2—2 in Figure 1.

Referring to the drawing, the reaction vessel comprises a vertically disposed outer cylindrical shell 1 provided with a substantially conical lower head 2 and an elliptical upper head 3. A catalyst discharge line 4 is joined to the lower head 2 and a discharge line 5 for fluid conversion products is joined to the upper head 3 and has a pressure control valve 6 interposed therein. Within the vessel an annular separating zone 11 is formed between the outer wall 1 and an inner cylindrical member 7 defining the contact and reaction zone 10. Member 7 is closed at its opposite ends, as shown, and is provided with an upper inlet line 8 for fluid reactants and a lower inlet line 9 for subdivided solid catalyst or contact material and carrier gas.

Fluid reactants, such as hydrocarbon vapors or gases, are supplied downwardly through line 8 into the contact and reaction zone 10. A carrier gas containing a subdivided solid catalyst suspended therein is supplied upwardly through inlet line 9 into the contact and reaction zone 10. The arrows indicate the general flow of the solid particles, carrier gas, fluid reactants and conversion products in zone 10. The carrier gas may comprise any convenient carrying medium such as steam, carbon dioxide, nitrogen, hydrogen, and light hydrocarbon gases such as methane, ethane, etc. or mixtures thereof. It will be apparent that the carrier gas also serves as a diluent in the reaction zone.

As indicated by the arrows in the drawing there is a general countercurrent movement of catalyst and hydrocarbon reactants in reaction zone 10 and considerable turbulence resulting in good mixing of reactants and catalyst in the central portion of the reaction zone. The velocity of the stream of carrier gas and catalyst is controlled and correlated with the velocity of the down flowing hydrocarbon reactants so that there is no substantial tendency for catalyst to settle out at the bottom of reaction zone 10.

The wall 7 at the central portion of zone 10 is provided with outlet ports 12 and deflecting or directing vanes 13 at the ports. As shown diagrammatically in Figure 2, the effect of these vanes or baffles is to impart a swirling motion to the reaction mixture and to direct the effluent mixture of hydrocarbon reaction products, carrier gas, and subdivided catalyst into the outer annular space 11 wherein the mixture is caused to impinge upon the inner surface of wall 1. The increased velocity and centrifugal motion thus imparted to the solid catalyst particles causes their substantial separation from the fluid reactants and carrier gas, and a mass of separated catalyst 14 falls to the cone bottom 2 of the vessel from which it is withdrawn through line 4.

In the case of most hydrocarbon conversion processes the catalyst will be contaminated with a combustible deposit which may be removed by regeneration with an oxygen-containing regenerating medium in a similar type of apparatus.

The fluid mixture of hydrocarbon reaction products and carrier gas is withdrawn through line 5 and valve 6 from the upper portion of zone 11 to further separation in fractionation equipment of a suitable type, not illustrated.

Although the drawing has been described in connection with a hydrocarbon conversion process, it will be apparent that the same contacting method provided can be applied to any other operation wherein it is desired to contact a subdivided solid material with fluid reactants, particularly a gas or vapor.

In some cases it may be desirable to provide additional separating means in line 5 to recover traces of the solid contact material which may escape from separating zone 11.

I claim as my invention:

1. In a process for contacting a fluid with subdivided solid contact material, the improvement which comprises introducing a stream of said fluid downwardly in a contact zone, introducing a stream of gas carrying said subdivided solid contact material upwardly into said zone, impinging the aforesaid incoming streams on each other in said contact zone to obtain intimate contact of said fluid with said solid particles, discharging the resulting mixture from an intermediate point in said contact zone to a separating zone, therein substantially separating said contact material from the fluid components of the mixture, and separately removing the separated materials therefrom.

2. A process for contacting fluid reactants with subdivided solid contact material which comprises introducing a stream of said fluid reactants downwardly into a substantially vertical contact zone; introducing a stream of gas carrying the subdivided solid contact material in suspension therein upwardly into said contact zone; impinging the aforesaid incoming streams on each other in said contact zone to obtain intimate contact of said fluid with said solid particles; removing the mixture comprising reaction products, carrier gas, and contact material from said contact zone intermediate its opposite ends; and separating solid contact material from a mixture of reaction products and carrier gas.

3. A process for the conversion of hydrocarbons which comprises flowing a stream of hydrocarbon reactants downwardly in a contact zone, flowing a stream of carrier gas containing a subdivided solid catalyst suspended therein upwardly in said contact zone, intimately and thoroughly mixing said streams in a region of said contact zone intermediate its upper and lower ends, withdrawing an effluent reaction mixture from said intermediate region, and separating catalyst particles from a mixture of hydrocarbon conversion products and carrier gas.

4. A process for carrying out hydrocarbon conversion reactions which comprises passing fluid hydrocarbon reactants downwardly into a reaction zone; passing carrier gas containing subdivided solid contact material upwardly into said reaction zone whereby to effect countercurrent flow of hydrocarbons and catalyst in at least a portion of said reaction zone; withdrawing an effluent mixture comprising resulting hydrocarbon conversion products, carrier gas, and contact material from said reaction zone intermediate its opposite ends to a separating zone; and therein separating solid contact material from the fluid mixture of hydrocarbon conversion products and carrier gas.

5. The process of claim 4 wherein said contact material comprises a hydrocarbon conversion catalyst.

6. A process for the conversion of hydrocarbons which comprises passing fluid hydrocarbon reactants downwardly into a reaction zone; passing a carrier gas containing suspended therein a subdivided solid catalyst upwardly into said reaction zone whereby to effect countercurrent flow of hydrocarbons and catalyst in at least a portion of said reaction zone; removing a reaction mixture comprising hydrocarbon conversion products, carrier gas, and catalyst from a point intermediate the ends of said reaction zone to an outer annular zone surrounding said reaction zone; withdrawing catalyst from the lower portion of said outer zone; and removing a fluid mixture of hydrocarbon conversion products and carrier gas from the upper portion of said outer zone.

7. A process for the conversion of hydrocarbons which comprises passing fluid hydrocarbon reactants downwardly into a conversion zone; passing a carrier gas containing suspended therein a subdivided solid catalyst upwardly into said conversion zone whereby to effect countercurrent flow of hydrocarbons and catalyst in at least a portion of said conversion zone; removing a reaction mixture comprising hydrocarbon conversion products, carrier gas, and catalyst from a point intermediate the ends of said conversion zone and impinging said mixture upon the outermost wall of an annular zone surrounding said conversion zone whereby to separate catalyst from a fluid mixture of hydrocarbon conversion products and carrier gas; withdrawing said separated catalyst from the lower portion of said annular zone; and removing said fluid mixture of hydrocarbon conversion products and carrier gas from the upper portion of said annular zone.

8. The process of claim 7 wherein said reaction mixture is impinged upon the outermost wall of said annular zone by means of directing vanes disposed in the communicating passage between said conversion zone and said annular zone.

9. A reaction vessel of the class described comprising in combination, a substantially cylindrical outer shell closed at the opposite ends, an inner wall substantially concentric with said shell and defining a mixing and confined reaction zone, said inner wall being spaced from the outer shell to define an anular separating zone therebetween, a downwardly pointing inlet for fluid reactants at the upper end of said reaction zone, an upwardly pointing inlet for subdivided solid contact material and carrier gas at the lower end of said reaction zone, an outlet for fluid conversion products communicating with the upper portion of said separating zone, and an outlet for subdivided solid contact material in a substantially conical lower head provided on said outer shell, the last named outlet communicating with said separating zone, the mid-portion of said inner wall being provided with openings therethrough connecting said reaction and mixing zone with said separating zone, and curved deflectors adjacent said openings in the inner wall to impart centrifugal motion to the mixture entering the separating zone from the reaction and mixing zone.

GUSTAV EGLOFF.